Oct. 18, 1932.  E. R. ARMSTRONG  1,883,452

MANIFOLD HEATER

Filed Sept. 4

Inventor
Edward R. Armstrong

Attorney

Patented Oct. 18, 1932

1,883,452

UNITED STATES PATENT OFFICE

EDWARD R. ARMSTRONG, OF COLUMBUS, OHIO, ASSIGNOR TO F. O. SCHOEDINGER, OF COLUMBUS, OHIO

MANIFOLD HEATER

Application filed September 4, 1930. Serial No. 479,715.

This invention relates to improvements in automobile heaters and particularly to motor vehicle heaters of the type utilizing heat normally radiated or released from the walls of an engine exhaust manifold, or associated conduits for utilizing the heated exhaust gases to heat air passing through a casing or confined passageway surrounding such an exhaust manifold or line, whereby such air following predetermined passage over the heated exterior surfaces of said manifold or line will attain a temperature rendering the same particularly effective for use in heating the passenger compartment or compartments of a motor vehicle. In certain of its specific aspects, the invention is directed especially to an automobile heater, although in a more generic field the invention is applicable to airplanes and other vehicles or compartments employing internal combustion engines.

It is a primary object of the present invention to provide a heater of the manifold type which will constitute an improvement in many respects upon heaters of this type heretofore developed and to produce a heater of efficient and economic design capable of delivering to an associated passenger compartment in a regulated manner large volumes of pure air at temperatures requisite to maintain the passenger compartment or compartments in a heated and comfortable condition, especially during periods of severely cold weather.

With these and other objects in view which will appear as the description proceeds, the invention consists in the novel features of construction, combinations of elements and arrangements of parts, hereinafter fully described and pointed out in the appended claim.

In the accompanying drawings:—

Figure 1:
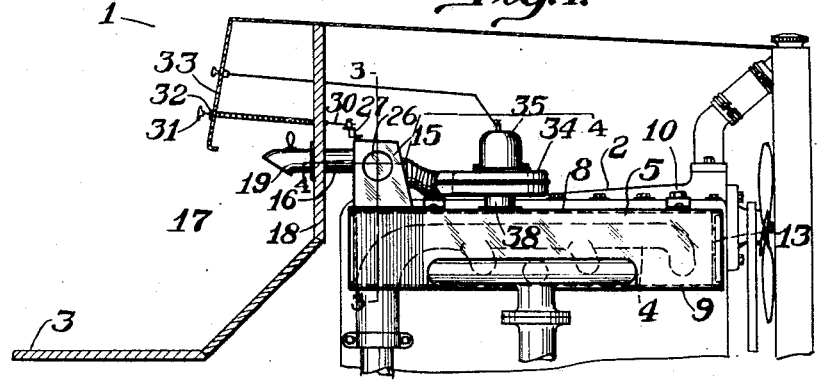
Figure 2:
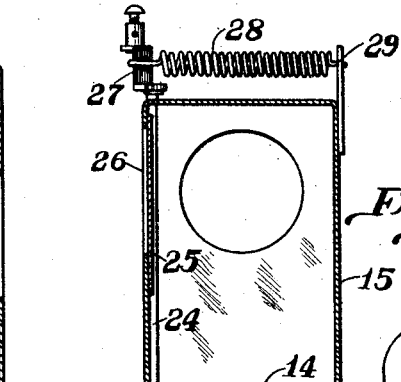
Figure 3:
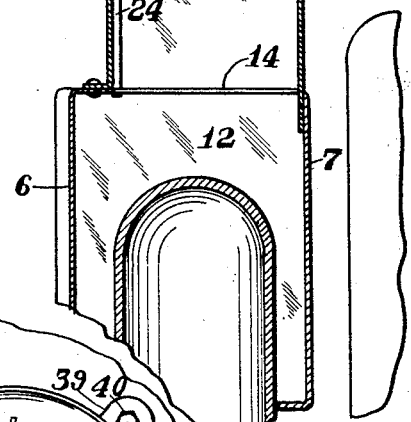
Figure 4:
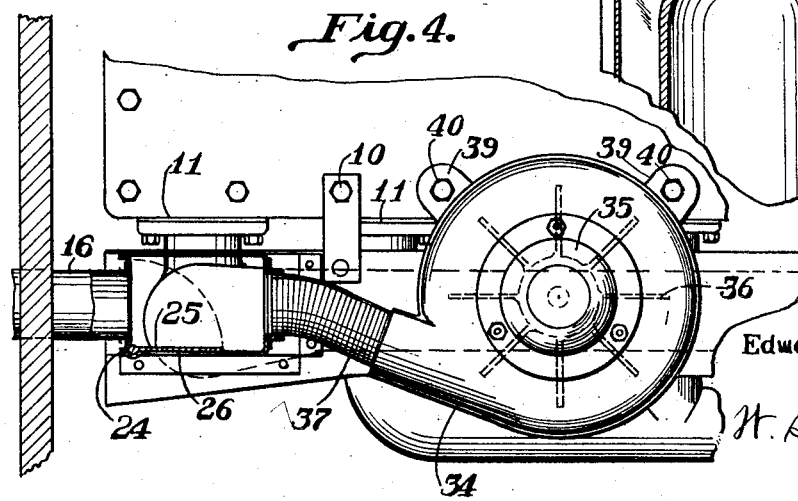

Figure 1 is a view in side elevation of an automobile heater constructed in accordance with the present invention and illustrating the application of the heater to an associated internal combustion engine and the passenger body of a motor vehicle, a portion of said body being shown in vertical section, Figure 2 is an enlarged vertical sectional view taken through that portion of the heater in communication with the motor vehicle body, Figure 3 is a transverse sectional view taken on the line 3—3 of Figure 1, Figure 4 is a plan view of the heater, partly in section as indicated by line 4—4 of Figure 1.

Referring more particularly to the drawing, the numeral 1 designates generally a motor vehicle which is provided with an internal combustion engine 2 and a passenger body 3 of any suitable type. The engine 2 includes the usual exhaust manifold 4 through which passes the heated exhaust gases discharged from the cylinders of the engine.

Surrounding the exhaust manifold 4 and extending longitudinally thereof is the heater 5 comprising the present invention. This heater is formed to comprise a sheet metal casing which includes spaced side walls 6—7 and top and bottom walls 8 and 9, and said casing structure is securely retained in its operative position around the exhaust manifold or substantially spaced from the exterior surfaces thereof by means of fastening bolts 10. Preferably, the wall 7 is spaced from the gasket connections 11 between the exhaust manifold branches and the cylinder block of the engine, to prevent the exhaust gases entering the air passageway 12 formed by the heater casing around the exhaust manifold. This feature insures the delivery of pure air only to the interior of the vehicle body. The front of the heater casing is provided with an opening 13 admitting air into the passageway 12 and the forced flow of the air through said passageway to the vehicle body.

The top wall 8 of the heater casing adjacent to the rear closed end of said casing is provided with an opening 14 between the passageway 12 and the interior of an outlet box 15 which is mounted on the rear portion of the casing. This box generally is of cubical form and is of sufficient height so that the rearwardly and longitudinally extending duct 16, connected with the rear wall of the box, will be located at the proper horizontal level to deliver heated air into the lower portion of the passenger compartment 17 in the body 3. The height, therefore, of the duct 16 will vary with different types of automobiles, depending upon their structural characteristics.

The duct 16 terminates rearwardly in an opening provided in the dash board 18, and loosely fitted for rotation in the open end of said duct is a hood 19. This hood comprises a longitudinally extending length of tubing having its discharge end formed with a curved or arcuate portion 20 and is adapted to be rotated bodily about the longitudinal axis of the duct 16. To retain this hood in its rotative position within the duct 16, the said hood is provided with a flange 21 adjacent to the dash board 18, which flange is received within a bracket 22, stationarily carried by the dash board, said bracket serving to prevent outward withdrawal of the hood and yet to permit of its free rotation about the longitudinal axis of the duct 16. The hood may be provided with a handle 23 to permit of its convenient manual adjustment. Usually, there is sufficient friction between the hood and adjoining stationary surfaces to permit said hood to be retained in any of its adjusted positions for controlling the direction of heat delivery into the vehicle body, although other suitable means may be used in this capacity if friction alone should not prove sufficient. It will be seen by adjusting the hood the air delivered to the vehicle body may be directed in any desired path. This is a distinct improvement over earlier types of heaters wherein air has been discharged directly and in but a single direction into the vehicle body. Frequently in motor vehicle operation it is desired to control this direction of air delivery either upwardly, downwardly or laterally with respect to the discharge duct and by the employment of the hood described this facility in the control of air desired is readily obtained.

In order to shut off flow of air to the vehicle body, there is mounted in the outlet box 15 a vertically journaled shaft 24. Within the outlet box the shaft 24 is provided with a flap or gate valve 25 and by the rotation of the shaft 24 this valve may be moved to a position obstructing air flow from the outlet box into the duct 16. When in this latter position the valve 25 uncovers a vent 26 formed in one of the side walls of the outlet box so that the air delivered by the casing 5 to the outlet box may be then discharged to the atmosphere without entering the vehicle body.

To maintain the valve 25 in its open and closed positions and to permit of facility in the operation thereof, the upper portion of the shaft 24 has secured thereto a crank arm 27 with which is connected a coil spring 28, the opposite end of the spring being anchored as at 29 to the upper wall of the box 15. Also connected with the outer end of the crank arm 27 is a flexible shaft or wire 30 which extends to a pull knob 31 mounted on a bracket 32 carried in conjunction with the instrument panel 33 of the vehicle body. By pulling or pushing the knob 31, the shaft 30 may be moved sufficiently to rock the shaft 24 against the resistance of the spring 28 and to thereby oscillate the valve 25, as desired. The spring 28 is connected with the crank arm 27 in such a manner that when such valve has been moved past a center position the tension of the spring automatically serves to maintain said valve in one or the other of its operating positions, thereby avoiding looseness and rattle in the operation of the heater and, moreover, insuring the maintainance of desired control adjustments.

Mounted on the top wall 8 of the heater casing is a housing 34 having mounted in the upper portion thereof an electrical motor 35 and having its lower portion formed to produce a fan chamber in which is arranged a horizontally rotatable fan or blower 36 which is driven directly by the motor 35. The outlet of the fan chamber communicates by means of a duct 37 with the outlet box 15, while the inlet duct 38 of the fan chamber communicates with the air passageway 12 formed by the heater casing. By the employment of the motor driven fan air is positively drawn through the passageway 12 and delivered to the body of the vehicle at any suitable point in a manner independent of the normal flow of air through said passageway while the vehicle is moving in a forward direction. The fan is therefore of advantage in delivering greater quantities of heated air to the vehicle body than when normal circulation is employed and is also of advantage in delivering heated air to the rear passenger compartment (not shown) of the motor vehicle rather than to merely the forward compartment thereof. Again, when the vehicle is stopped or parked for short intervals the operation of the fan will result in maintaining the body of the vehicle heated as long as the wall of the exhaust manifold retains sufficient heat to permit of this condition. To provide additional support for the motor housing, the latter is connected by means of brackets 39 with the bolts 40 used in bolting the engine head on the cylinder block, thus providing a secure mounting for the motor housing which relieves the heater casing of strain.

In view of the foregoing it will be seen that the present invention provides an automobile heater of the manifold type of neat and trim appearance when applied to an engine manifold. It is compact in size and, due to the provision of the register extension, formed by the curved hood 19, the heater delivers quickly and with high velocity an abundance of clean, fresh, hot air into the vehicle body.

The construction of the passageway 12, the outlet box 15 and the adjustable duct leading into the body provide for free and unrestricted passage of air through the heater and these parts are so proportioned as to avoid throttling or obstructing in any way the air passage. The exhaust manifold only of the engine is covered by the heater, which makes it possible to adjust engine valves and make other engine adjustments without removing the heater casing. The exhaust manifold gaskets are not covered by the casing and this construction removes any possibility of obnoxious engine gases, fumes and odors entering the heater and then passing into the car. The adjustable register extension or disseminator 19, which is operated manually by the insulated knob or handle 23, throws the air within the car in any direction desired and effectively spreads it at the same time. Hot air may be prevented from entering the interior of the vehicle body by the conduit fitting shut-off valve 25, the control for which is conveniently located on the instrument panel.

What is claimed is:

Heating apparatus for motor vehicles including an air heater of the exhaust manifold type having an air outlet opening at the rear portion thereof, said outlet opening being located in the top wall of said heater, an outlet box over said opening in communication with the interior of said heater, a conduit leading from the rear wall of said box to the interior of the vehicle, the front wall of said box being provided with an opening in substantial alignment with the opening in the rear wall of said box, a conduit leading from said heater at a point in advance of said box to the opening in said front wall, a motor driven fan in said conduit, one of the remaining walls of said box being provided with an opening in communication with the atmosphere, and a gate valve normally closing the latter opening when the heater is in use but which may be swung to uncover the opening and close the conduit leading to the interior of the vehicle.

In testimony whereof I affix my signature.

EDWARD R. ARMSTRONG.